United States Patent [19]

Vitous

[11] Patent Number: 4,809,594
[45] Date of Patent: Mar. 7, 1989

[54] TEA BREWER

[75] Inventor: Charles J. Vitous, Berwyn, Ill.

[73] Assignee: Bloomfield Industries, Inc., Chicago, Ill.

[21] Appl. No.: 84,639

[22] Filed: Aug. 11, 1987

[51] Int. Cl.[4] ............................................. A47J 31/00
[52] U.S. Cl. ...................................... 99/280; 99/295; 99/299; 99/316; 426/433; 426/435
[58] Field of Search ................. 99/279, 280, 281, 282, 99/283, 284, 285, 288, 290, 291, 295, 299, 300, 304, 305, 306, 307, 316; 426/433, 435; 137/862, 866, 872

[56] References Cited

U.S. PATENT DOCUMENTS

| | | | |
|---|---|---|---|
| 1,057,058 | 3/1913 | Hoover | 137/862 |
| 2,327,942 | 8/1943 | Thoresen | 137/866 |
| 4,147,097 | 4/1979 | Gregg | 99/283 |
| 4,309,939 | 1/1982 | Stover | 99/285 |
| 4,579,048 | 4/1986 | Stover | 99/280 |
| 4,603,620 | 8/1986 | Daugherty | 99/284 |
| 4,603,621 | 8/1986 | Roberts | 99/295 |
| 4,621,571 | 11/1986 | Roberts | 99/281 |

OTHER PUBLICATIONS

Bunn-O-Matic Corporation, Installation, Operation Instructions for "New Bunn-O-Matic® Iced Tea Brewers", (17 pages; Brewers Identified as Models TL3 & TL6; undated).
CECILWARE, Operation Manual for "Fresh Brewed Iced Tea Dispenser System", (4 pages; Brewers Identified as Models T1F & FBT-3; apparently dated 11/85).

*Primary Examiner*—Robert W. Jenkins
*Attorney, Agent, or Firm*—Lee & Smith

[57] ABSTRACT

A tea brewer which automatically inlets a proportion of dilute water and brewing water to a siphon system to brew an extract for blending with the diluting water. The tea brewer includes a hot water tank having a volume of heated water therein and a fill tube for receiving a volume of cold water at the bottom of the hot water tank commensurate with the amount of hot water required to be siphoned therefrom to brew the tea leaves and make the extract. A vent for the hot water tank is provided to ensure that the full amount of hot water is siphoned. A cold water inlet line to the hot water tank is vented whereby to prevent cold water from being siphoned back along the cold water inlet line during the end of the cycle. The tea brewer further includes a line restrictor for creating a venturi effect along the dilute water inlet line. A needle valve is maintained at a slight back pressure in order to prevent starving the cold water inlet line carrying the displacement volume of cold water to the hot water tank.

28 Claims, 4 Drawing Sheets

TEA BREWER

BACKGROUND AND SUMMARY OF THE INVENTION

The invention generally relates to an automatic tea brewer. More specifically, the invention is directed toward brewing tea by means of a siphon-type brewing device which brews a portion of the tea into an extract for mixing with a larger portion of diluting water to make ice tea.

Known brewing devices, such as those used for brewing coffee, have utilized the principle of displacing a volume of hot water from a tank with a volume of cold water introduced generally near the bottom thereof whereby to cause the hot water to be siphoned to a brew basket or brew chamber containing coffee grounds. A few prior art tea brewers have utilized siphon-type brewing functions, but they have employed an inefficient arrangement having separate expansion tanks or separate inlet cold water basins. Certain of these prior art devices have employed a plurality of sensors and time relays to control the volume of water in cooperation with water level floats or probes. Such systems have thereby incorporated unnecessarily complex electrical control systems that often times become maladjusted and can experience clogging of water probes and floats.

It has been a problem in brewing tea to ensure that the brew water that is introduced into the ground tea leaves is at a desirable brewing temperature, usually about 200°±5° F. In this regard, when using a siphon-type system, it is important to limit, if not prevent, the mixing of the inletted cold dilute water with the hot water in the tank to maintain the wanted brew temperature. Usually, a loop-type heating element resides within the hot water container for maintaining the water at the prescribed brewing temperature. Thus, if unwanted mixing occurs with cold dilute water, the goal of maintaining the temperature in between brewing cycles is defeated.

While industry standards for brewing tea vary and no one set of guidelines is generally recognized as the pre-eminent brewing procedure, it has been determined from tea manufacturers, and others in the food services art, particularly those involved with brewing tea in large volumes for restaurant use, that an extract of tea is preferably mixed into the dilute in a proportion of one part of extract to three parts of dilute cold water.

It has been further determined that the mixing of the extract with the dilute is preferable to the reverse in order to prevent a clouding effect that may otherwise occur. With this in mind, it is therefore important that when employing a siphon-type system a controlled volume of dilute is separately introduced to a reservoir to subsequently then receive the proportionate measure of extract in another determined proportion. It has been found that a controlled valve and inlet timing means should be provided whereby the proportions of extract to dilute are unfailingly provided for each batch.

For long and efficient use, it has been discovered from studying prior art deficiencies, that it would be desirable to limit the electronic controls for a siphon-type tea brewing system whereby to preferably inlet a volume of water at a timed solenoid valve comprising the only electrical inlet water volume control in the system.

In addition to achieving the blending of about one-quarter extract to three-quarters dilute, it has also been learned from the food and restaurant industry that providing for a nine to ten minute flow-through steeping period for the tea leaves would be desirable, whereby as a result the one-quarter extract portion is introduced into the dilute during this nine to ten minute period to achieve desired taste and properly extract a tasteful flavor and strength from the tea leaves.

In attempting to minimize the number of major components in a tea brewing system, it has been learned that the provision of the expansion portion for displaced hot water is desirably achieved by providing an additional volume within the hot water container rather than using a separate receptacle or chamber for that purpose. However, in seeking to eliminate these other components and employ the hot water container itself for this function, it has been determined to be important to siphon the hot brew water from the side, to the top, of the container slightly above the normal at-rest level of the hot water, thereby to siphon the water when the volume of hot water is raised to a second higher level caused by the inletting of the cold water at the bottom of the hot water container.

In achieving the prescribed proportion of extract to dilute, it is important that substantially the full siphon amount reach the brew chamber. Therefore, the water tank has been found most efficiently operative when provided with a vent in order to maintain a positive pressure at the opening to the siphon from the tank to vent the tank to the atmosphere in order to prevent suction and allow the system to fully drain the siphon tube. Additionally, the vent affords a safety feature so that in the event that there is an overfill into the hot water tank due to a pressure surge, or a blockage in the siphon, the tank overfill amount may be safely drained through the vent tube that leads, for example, to the brew chamber.

During the end of a brew cycle, it has been found beneficial to ensure that the cold water that is introduced via a fill tube to the bottom of the hot water tank is not siphoned back through the inlet line into the valve at the end of the cold water inlet cycle and thereafter conveyed into the dilute reservoir. Thus, it has been found necessary to in some way vent the tank inlet line to atmosphere in order to prevent a reverse siphoning of the water from the bottom of the hot water tank.

Further, in venting the cold inlet water line it has also been discovered that it is important to make sure that the cold dilute water is prevented from being siphoned to the hot water tank or to the brew chamber. Therefore, a desirable system would provide for negative pressure being created generally along the vent of the cold water inlet line whereby to make sure that the vent line for the cold water line is prevented from conducting flow toward the hot water tank or to the brew chamber.

The foregoing problems and impediments found in providing a siphon-system for brewing tea have been overcome by my unique tea brewer. The inventive tea brewer may be summarized as comprising a simplified siphon-system requiring only four major component consisting of: a heated tank for maintaining the brew water at the appropriate temperature; a needle valve assembly for proportionately directing inletted cold water in part to the hot water tank for brewing and in larger part to a dilute reservoir for later mixing with the brewed extract; a water flow timer for inletting the appropriate amount of flow to the valve; and, a solenoid valve associated with the water flow timer to be opened and closed in time controlled sequences. The needle valve assembly is adjustable for maintaining different extractions as might be required with changed water conditions or qualities of tea. The needle valve assembly is positively pressurized throughout the brewing cycle to run full. Positive pressure is achieved by a restrictor along the dilute outlet side of the needle valve whereby the brew water proportion directed through another outlet side is not starved so that is positively pressured throughout the timed period for inletting the cold tap water that is received from the solenoid controlled inlet valve.

The hot water tank is cooperative with a siphon tube, or brew water take or line having an expansion accommodating drip-resistant outlet elbow that receives hot water from the hot water tank beginning when it reaches a certain level as it is pushed upwardly by the inletted cold water at the bottom of the tank. A vent as provided through a generally sealed cover of the tank which vents to atmosphere generally above at a spray disc over the brew chamber. Thereby the siphon or brew water line is kept under positive pressure throughout the cycle so that all the brew water is siphoned to the brew chamber by preventing negative pressure in the water tank above the inlet to the siphon tube.

At the end of the timed solenoid valve cycle for inletting cold water, a reverse siphoning of water from the cold water inlet of the hot water tank is prevented by venting the system to ensure that a positive pressure is maintained in the cold water inlet line. The venting is achieved by a vent tube at the cover of the hot water tank being joined to a branch of a Y-connector arranged along the dilute inlet line downstream of the restrictor and needle valve whereby to ensure that cold water is not siphoned back into the needle valve but is instead directed into the bottom of the hot water tank. The venting is most critical near the end of the timed inlet cycle. This assures that the intended amount of brew water is properly delivered to the hot water tank. Further, in order to prevent the unintended siphoning of cold water from the dilute water line into this first mentioned vent line, the restricted high pressure flow caused by the restrictor is created upstream and through the straight line portion of the Y-connector which creates a negative pressure at the angled branch of the Y-connector that connects to the vent tube. The negative pressure draws the vent line clear so that it sucks water toward the dilute and stops the cold dilute water from reaching the spray head and disc assembly via the vent line.

The tea leaves are placed into the brew chamber arranged under a spray head and perforated disk at the outlet end of siphon tube and are bathed in the siphoned water from the hot water tank. An appropriately sized outlet orifice is provided at a sump in the bottom of the brew chamber for delivery into the reservoir holding the separately inletted dilute portion of the water. The siphon system, brew chamber, and oulet orifice, are provided to have a flow-through steep time of about nine to ten minutes as generally preferred and suggested by the manufacturers of tea blends.

The reservoir is independently movable and may be taken to a remote service location when a brew cycle is done. The reservoir preferably includes a spigot valve and an associating sight gauge for determining the level of tea therein, whereby the tea may be dispensed into a glass filled with ice for service to the custom. After one brew has been completed, another reservoir of like design may be placed in association with the siphon system, and a new load of tea placed in the brew chamber for a sequental batch of tea to be made. The hot water tank is arranged with a running thermostat system so that the brew water is maintained at an appropriate brewing temperature, usually about 200° F. The reservoir is provided with two openings, one to be disposed below the outlet orifice of the brew chamber, ad a second openign generally adjacent a housing for the siphon system through which a water spout is connected to the dilute line extending from the needle valve assembly to feed the dilute water into the reservoir separate from the tea extract fed from the brew chamber.

In accordance with the invention, the cold water that displaces the hot water for steeping the tea is introduced under pressure generally at the bottom of the hot water container, rather than entering by downward cold wear migration as in typical coffee brewing siphon systems. This causes the water to stratify and form a lower temperature cold water piston effect urging upwardly the much hotter water which had been contained in the hot water container. As a result, the water siphoned from the tank through the siphon tube to the spray head and disc over tea leaves is generally at the desired brewing temperature which the heating element maintains in the hot water tank prior to the initiation of a brew cycle.

BRIEF DESCRIPTION OF THE DRAWINGS

Other objects and advantages of the invention will become apparent upon reading the following detailed description and upon reference to the drawings in which.

DETAILED DESCRIPTION OF A PREFERRED EMBODIMENT

While the invention will be described in conjunction with a preferred embodiment, it will be understood that it is not intended to limit the invention to the embodiment described. Instead it is intended to cover all alternatives, equivalents, and modifications included within the spirit and scope of the invention as defined by the appended claims.

Components Of The Brewing System

Figure 1:
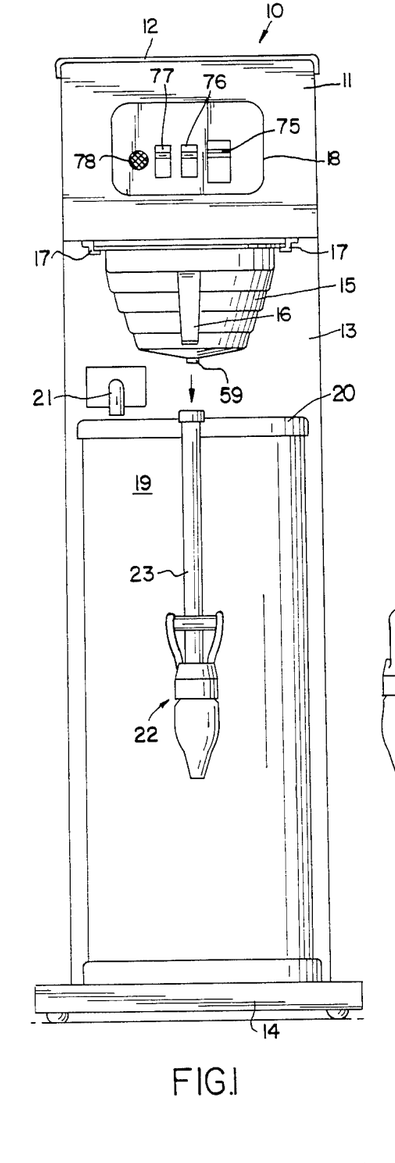
FIG. 1 is a front elevational view of my inventive tea brewer illustrating the control panel for the device, a brew chamber for receiving hot water to create a tea extract from the tea leaves, and a reservoir for separately receiving the extracted tea and dilute water for mixing therein to form tea ready and to be dispensed through an outlet spigot.
Figure 2:
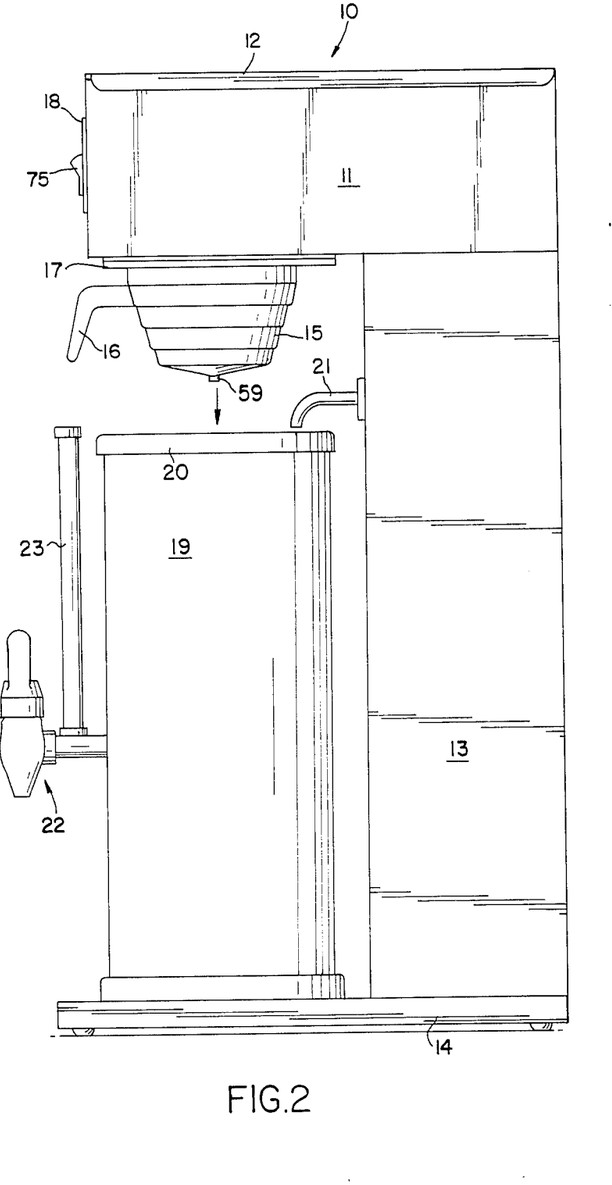
FIG. 2 is a side elevation of the tea brewer as shown in FIG. 1.

My inventive tea brewer is generally referenced at 10 and is shown at a front and side elevational view thereof in FIGS. 1 and 2. The tea brewer 10 incorporates a siphon action of hot water from a continually heated container into a brew chamber holding tea leaves. A metered amount of brew water is directed by the siphon action to the brew chamber for passing through the tea leaves while at the same time a larger amount of diluting cold water is introduced directly into a reservoir below the brew chamber. Thus, two entries of liquid are provided whereby the hot brewed tea amount, called an extract, is mixed with the diluting cold water.

More specifically, it will be seen from FIGS. 1 and 2 that the brewer 10 has an upper housing 11 with a removable top lid 12. A lower housing 13 is attached to and extends below the upper housing 11 to terminate at a support base 14. A brew chamber 15 fluidly communicates below the upper housing 11 for receipt therein of hot water. A handle 16 allows for the brew chamber 15 to be manually positioned and removed from the upper housing 11 by means of slide track supports 17 included on the underside of the upper housing 11 for supporting the upper outside periphery of the brew chamber 15 in a known manner. The brew chamber 15 has a generally funnel-shaped stainless steel design.

The front face of the upper housing 11 has a control panel 18 which is arranged with control switches for the operation of the tea brewer 10. A tea reservoir 19 is disposed below the brew chamber 15 and receives through a cover 20 thereof the brewed tea extract from the brew chamber 15 and through a separate cold water spout 21 the dilute water which is introduced into the reservoir 19 for mixing with the tea extract.

The tea extract 19 includes a manually operable spigot and handle assembly 22 which associates with a sight gauge 23 extending thereabove for monitoring the level of the tea held within the reservoir 19 in a known manner.

Figure 3:
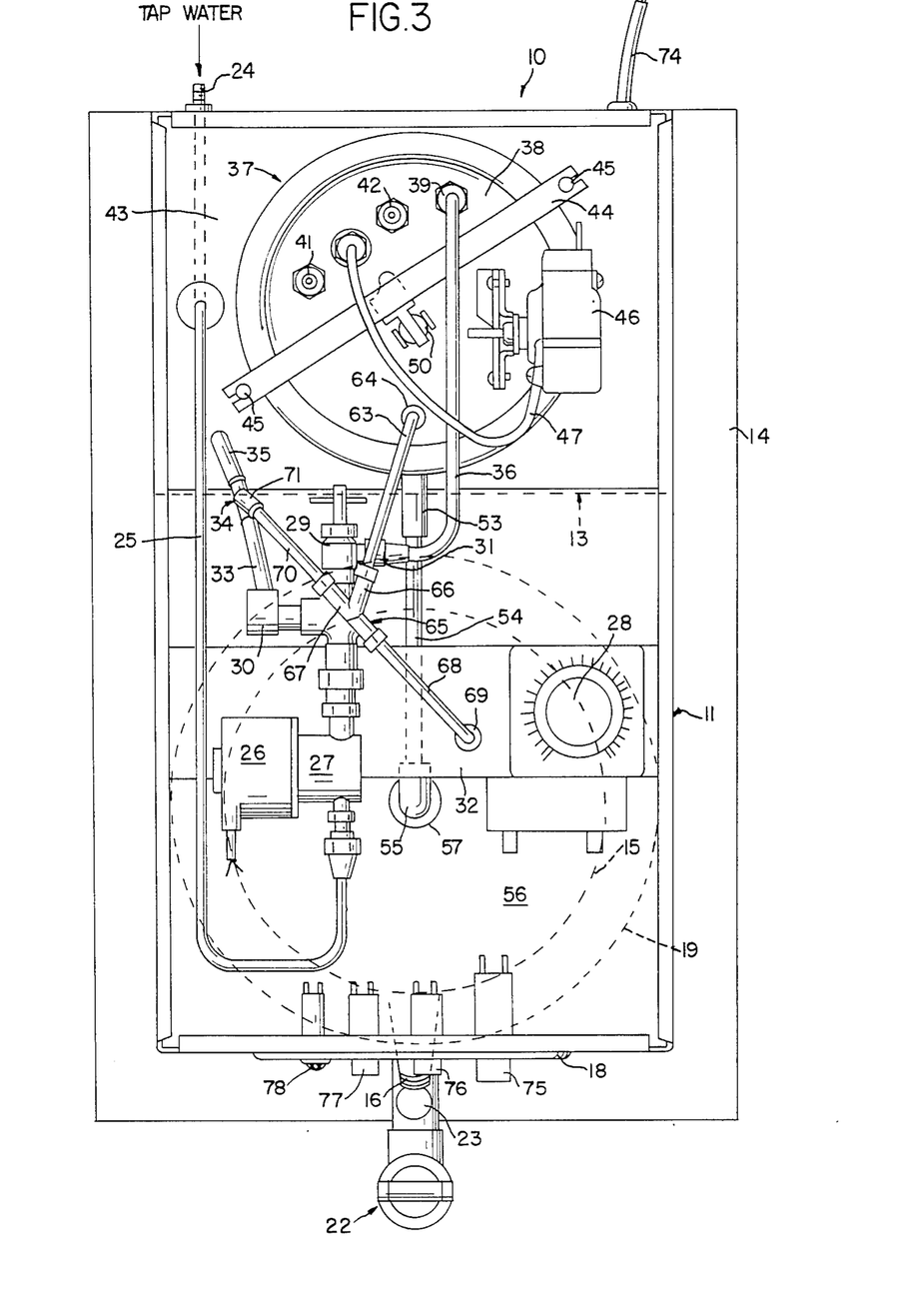
FIG. 3 is a top view of the tea brewer as shown in FIGS. 1 and 2 but having a top cover plate removed showing the control timer and valve for inletting of cold water in one path to the reservoir and in a second path into a hot water container having arranged therewith a thermostatic control system wherein all controls and adjustments are accessible from the top of the device.
Figure 5:
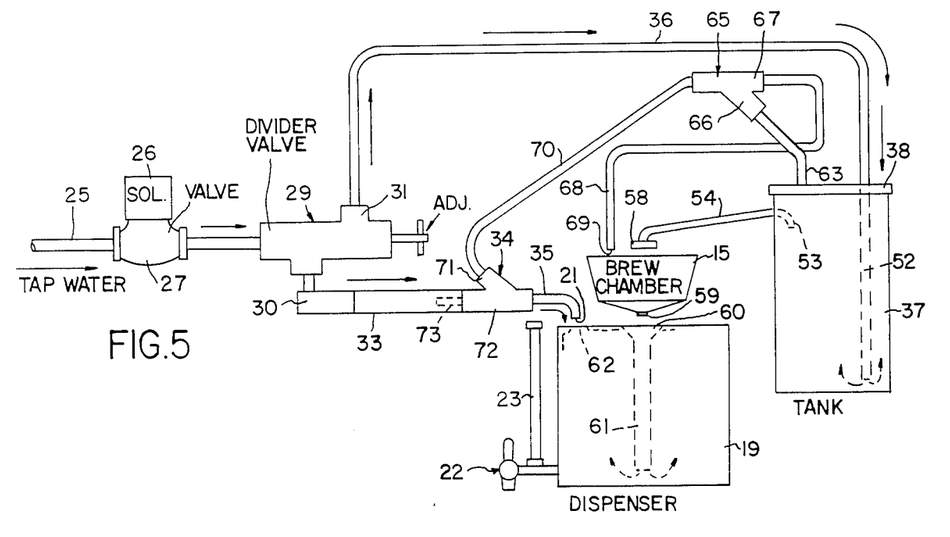
FIG. 5 is a schematic view of the water flow and venting operation of the brewer and having a control valve for inletting cold tap water and directing it to either to the hot water tank to siphon hot water into the tea leaves for extracting the tea or in a separate proportion that is directed to the reservoir for diluting the extract mixed therewith; and, FIG. 6 is a schematic view of the electrical circuitry for controlling the operation of the timers, solenoid valve, heating element and thermostat system for the tea brewer.

Turning next to the top plan view of the interior of the housing 11 in FIG. 3, and the schematic flow diagram in FIG. 5, the tea brewer 10 is supplied by a source of cold water, such as water service inlet line 25, which generally will provide normal street water line pressure in a range of about 30 to 60 p.s.i.

The volume of cold water admitted is controlled by a solenoid 26 and associated valve 27 that are caused to be open for a period of time set at an electrically communicating timer 28 in a known fashion. In the exemplary embodiment the timer 28 is set for an inlet period of four minutes and 5 seconds for the passage therethrough of cold water in the amount of about 384 ounces. Immediately downstream of the valve 27, a needle valve 29 having two outlets is arranged to receive the inletted water from the valve 27. The water is directed either through a first outlet at an elbow fitting 30, which constitutes the dilute cold water line, or through the needle valve 29, to a second downstream outlet at a fitting 31 for receipt therethrough of the cold water used to displace hot water for brewing the tea leaves held in the brew chamber 15. In the preferred embodiment the needle valve 29 is kept full under a slight back pressure in order to allow the needle valve to control the flow and prevent starving the fitting 31 from receipt of cold water. The amount of hot water required for extracting the tea is less than the amount used for dilution in about the preferred ratio of ¼ parts of extract to ¾ parts of dilute.

A cross support member 32 extends interiorly across the upper housing 11 for the support of the timer 28, solenoid 26, valve 27, and needle valve 29, as shown in FIG. 3.

A first section 33 of a dilute line, is preferably formed of silicon rubber tubing, and extends from the elbow fitting 30 to a first Y-connector 34, preferably made of nylon, along a straight line section of the Y-connector 34. At the other side of the straight line section the Y-connector 34 as second dilute line section 35 is fluidly connected and conveys the cold dilute water to the spout 21. Dilute line section 35 also is preferably silicone rubber tubing.

At the needle valve 29, a cold water inlet tubing 36 is connected at the fitting 31 to fluidly convey the cold water used to displace a corresponding siphoned volume of hot water during a brewing cycle from a hot water tank 37. The cold water inlet line, or tube 36, extends through a substantially sealed cover 38 covering the hot water tank 37 at a water tight compression fitting 39 of a known design.

Figure 4:
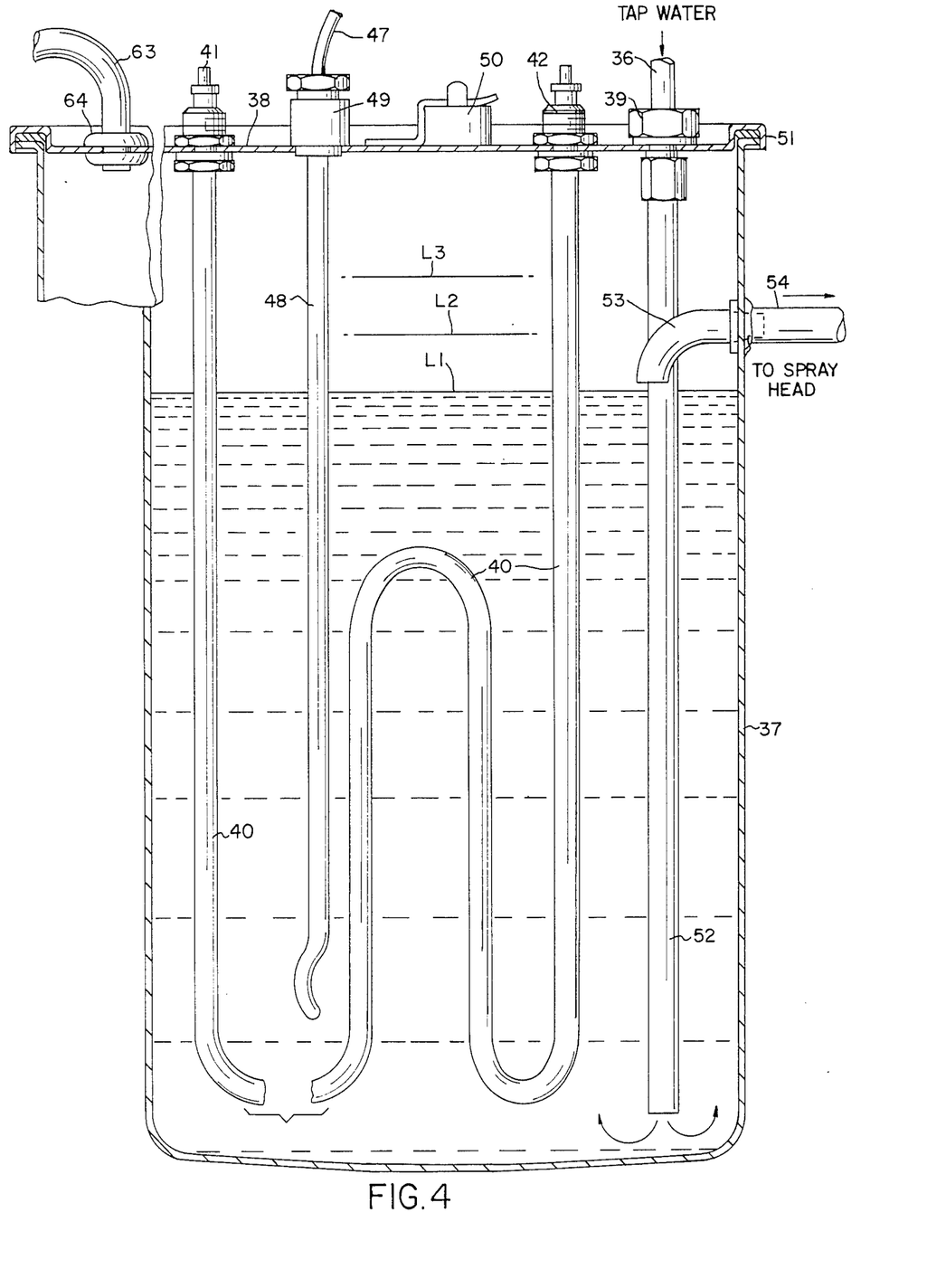
FIG. 4 is a developed sectional view taken through the hot water tank and showing the arrangement of a vent tube, heating element, sensing tube for a running thermostat, inlet for cold water inletted, a cover, and a siphon tube for delivery of hot water to a spray head.

The hot water tank 37 is maintained at a desired temperature by the provision of an electrical resistance heating element 40 supported within and which in the exemplary embodiment comprises a 1500 watt, 120 v., single loop heating element. Terminals for the heating element 40 are provided at 41 and 42, which are mounted at the cover 38. A support plate 43 for the hot water tank 47 extends across the upper interior of the lower housing 13 for support of the hot water tank 37 generally above the base 14 and within the vertical lower housing 13. As will be explained below, the hot water tank 37 is arranged whereby the heating element 40 is thermostatically controlled to maintain a certain desirable brewing temperature of generally about 200° F. for brewing tea, but can be varied. Also, while the tea brewer 10 is explained in the illustrative example as being capable of brewing about 3 gallons of tea, the volume may be varied by the adjustment of the timer 28. The tea strength can be varied by the adjustment of the needle valve 29 to control the proportion of brew water to diluting water.

To keep the cover 38 generally sealed atop the hot water tank 37 a hold-down bar 44 is provided which is channel-shaped and extends generally diametrically across the top of the cover 38. The hold-down bar 44 is releasably secured by fasteners 45 clamping it to bracket means on the hot water tank 37 (not shown) and thereby pressing the cover 38 atop the tank 37.

Operation of the heating element 40 is controlled by a running thermostat 46 which has an oil filled tube 47 extending therefrom to communicate through the cover 38 with an elongate sensing tube 48 that extends downwardly into the hot water tank 37. The tube 47 is joined to the sensing tube 48 at a compression fitting 49 at the cover 38.

Should the running thermostat 46 malfunction, or should an insufficient amount of water be maintained within the hot water tank 37, a safety high limit thermostat 50 is also provided atop the cover 38, which is adjusted to open the electrical circuit for the running thermostat 46 upon the sensing of a certain temperature.

A sealed overlapping lip joinder 51 is formed between the top of the hot water tank 37 and the cover 38 and serves to tightly seal the hot water tank 37 upon fastening the hold-down bar 44. This sealing helps maintain the hot temperature in the tank 37 and safely prevents spilling of the hot water tank 37 during operation or accidental bumping.

In order to convey the hot water from the tank 37 into the brew chamber 15 to make the tea extraction, hot water from the top region of the tank 37 is displaced and siphoned outwardly in a prescribed proportion to the dilute water conveyed through the dilute line section of tubing 35.

The brew water directed through the cold water inlet tube 36 passes through the fitting 39 at the cover 38 into fluidly joined fill tube 52 for the inletting of the cold water to the tank 37. The fill tube 52 in preferred form extends to be close to the bottom of the hot water tank 37, preferably at less than about one inch from the bottom, so that a stratification of inletted cold water will act as a vertically moving water piston. In this regard, turbulence of the inletted water through the fill tube 52 is to be avoided so that the hot water/cold water stratification can occur whereby the water that is moved upwardly is substantially at the same heated temperature as existed before introduction of the cold water. To aid in this goal, the fill tube 52 is preferably provided with a slightly larger diameter than the diameter of the cold water inlet tube 36. In the exemplary embodiment, the tube 36 has a ¼ inch inside diameter and the fill tube 52 has an internal diameter of ⅜ inches.

Just before inletting cold water through the fill tube 52, the hot water tank 37 has a water level L1 which is an at-rest water level for the volume of water which is maintained at the desired 200° F. brewing temperature by the on and off operation of the running thermostat 46 whereby to continuously have hot water available for brewing. As the inletted cold water moves downwardly through the fill tube 52, and then inwardly at the bottom of the hot water tank 37, the water level will rise to an upper level L3 as shown in FIG. 4. This level L3 is generally the maximum water level that would be reached during the four minute and 5 second inlet cycle timing of the timer 28 for the open time of the valve 27. An elbow outlet fitting 53 opens inside the tank 37 generally above the level L1 and provides an outlet to a siphon or brew water line 54. Until the level of the water in the tank reaches a level L2 of the siphon line 54, which is higher than the opening of the elbow fitting 53, siphoning will not occur. The elbow fitting 53 allows for minor water level variations in a range below level L2 before siphoning will ensue. Thus, a level up to L2 can be reached before siphoning occurs, such as if there is an abnormal increase in the water tank siphoning occurs, such as if there is an abnormal increase in the water tank temperature and resulting extra expansion during slight overheating. The siphon or brew water line 54 will therefore prevent unwanted dripping or leaking due to typical minor fluctuations in the water volume. In the preferred embodiment the elbow outlet fitting 53 is made of brass and provides a vertical difference between the outlet and inlet of about ½ inch whereby about ½ inch of expansion above level L1 may be accommodated without inadvertent siphoning through the siphon or brew water line 54. Of course different size elbow fittings may be used in practicing the invention.

As best viewed in FIG. 5, the siphone line 54 slants downwardly in the preferred embodiment at about 7° of slope to be joined to a spray head fitting 55. The spray head fitting 55 extends through a housing wall 56 at an aperture 57 thereof. The wall 56 comprising a horizontal bottom wall portion of the upper housing 11 which extends generally above the brew chamber 15. The spray head fitting 55 opens to a spray head assembly 58 for the distribution of the siphoned hot water from the siphon line 54 over the tea leaves placed within the brew chamber 15. The hot water is siphoned from the tank 37 until the water recedes through the siphon or brew water line 54 whereby to cause the tank level to drop below level L2 and break the siphon which stops the flow of water to the spray head assembly 58. In the exemplary device, approximately 96 ounces of hot brewing water is siphoned through the siphon or brew water line 54 onto the tea leaves in the brew chamber 15. It has been found that it is desirable to pass the hot brewing water through the tea leaves at a much slower rate than has been used in comparably sized siphon systems for brewing coffee. Siphon-type coffee brewers however do not employ a dilute proportioning system and the coffee is to be drunk in the form that it is brewed in the brew chamber. It has been found that in preparing 3 gallons of tea the last drippingn of tea extract from the brew chamber 15 desirably occurs at from about nine to about ten minutes after the initiation of the inlet of water through the valve 27. The brew chamber 15 is provided with a lipped orifice 59 for draining the extracted tea in a smooth flow. In the preferred embodiment to achieve the about nine to ten minutes of cycle time, the lipped orifice 59 is provided with a diameter of 0.104 inches.

The orifice 59 opens to a receiving aperture 60 through the cover 20 of the tea reservoir 19. A dip tube 61 extends from the receiving aperture 60, as shown in dashed line in FIG. 5, to direct the tea extract to enter the reservoir 19 generally near the bottom thereof for mixing with the cold dilute water that is contemporaneously introduced from the cold water spout 21 through an inlet opening 62 through the cover 20.

It is important that the present amount of brew water for extracting the tea be effectively siphoned from the hot water tank and not impeded by any suction or reverse siphon action, as the water level drops from L3 downwardly during the siphon period. In order to break any negative pressure caused within the volume of the hot water tank above level L3, a vent tube 63 is provided to extend through the cover 38 at a water tight fitting 64. The vent tube 63, as will be explained, vents to the atmosphere in order to provide for atmospheric pressure to exist in the upper portion of the hot water tank 37 for completing the siphon action so that all the flow is directed outwardly to the spray head assembly 58.

The vent tube 63 extends from the fitting 64 to a second Y-connector 65 which is also preferably made of nylon. While not critical, the vent tube 63 as shown in the drawings is connected to the branched section 66 of the Y-connector 65. The straight line section of the Y-connector 65 is generally referenced at 67. At one side, the straight line section 67 is connected to a tube 68 which extends therefrom to pass through the cross support 32 and have an open end 69 thereof opening generally near the spray head assembly 58 above the brew chamber 15. This vent arrangement also serves as an expansion safety device so that in the event that excessive heating takes place and the water inside the hot water tank 37 expands upwardly toward the cover 38—well above level L3—the overflow water will be safely diverted to the brew chamber 15 rather than spilling interiorly of the tea brewer 10 which might otherwise cause damage and potential for electric shock. The opposite side of the straight line section 67 of the Y-connector 65 is joined to a tube 70 which is connected at its other end to the branched side 71 of the first Y-connector 34. As a result, the dilute line tube sections 33 and 35 are also vented to the atmosphere.

It has been found important to prevent any cold displacing water from being drawn from the inlet line 36 near the close of a brewing cycle which may potentially be caused by a siphoning in the reverse direction from the cold water inlet tube 36 back through the needle valve 29. Accordingly the cold water inlet line 36 is vented to the atmosphere through the Y-connectors 34 and 65. As a desirable result of the venting, the intended full amount of displacement water to be passed through the inlet line 36 is assured. It is also important to prevent the cold water that is to be directed through the dilute tube line sections 33 and 35 from entering the spray head assembly 58 through the vent line 70 which would cause the unwanted introduction of cold water into the spray head assembly 58. It also has been found to be desirable to prevent drawing any water from the dilute water inlet line 33 or 35 into the hot water tank 37, which could ocur at the end of a cycle. As mentioned above, it has been found important to keep the needle valve 29 under slight pressure so that the needle is flowing full and properly directing the proportionate amounts of water to the cold water inlet tube 36 and the dilute line section 33. Fortuitously this restrictor function aids in solving the concern with the reverse siphoning from the dilute lines. To create positive pressure in the needle valve 29 and at the same time assure that cold water is not inadvertently siphoned or suctioned backward from the dilute lines into the vent for the hot water tank, the invention advantageously relies on a venturi phenomena that occurs at the Y-connector 34 creating a lower pressure along straight line section 72 than at the branched angled side 71.

By creating a negative pressure through the straight line section 67 of the Y-connector 65, it is always assured that the water will be drawn in a direction through tube 70 from the Y-connector 65 to keep the Y-connector 65 clear and thereby keep the cold dilute water from reaching the spray head assembly 58.

The venturi effect is created by the provision of a restrictor 73 placed within the first section of the dilute line at 33 preferably nearer the Y-connector 34 than the fitting 30, as illustrated in FIG. 5. The restrictor is made of stainless steel and comprises an orifice plug which in the exemplary embodiment provides an orifice of $\frac{1}{2}$ the diameter of the lines 33 and 35. In the disclosed embodiment, the lines 33 and 35 are $\frac{1}{4}$ inch internal diameter tubing. The use of the restrictor 73, as explained, creates back pressure within the flow-dividing needle valve 29 so that it flows full to control the $\frac{1}{4}:\frac{3}{4}$ ratio of brewing water to dilute water and also provides for a negative pressure at the joinder of the straight line section 72 to the branched inlet section 71 of the Y-connector 65 to create a suction and to draw water to the Y-connector 34 away from the Y-connector 65.

Figure 6:
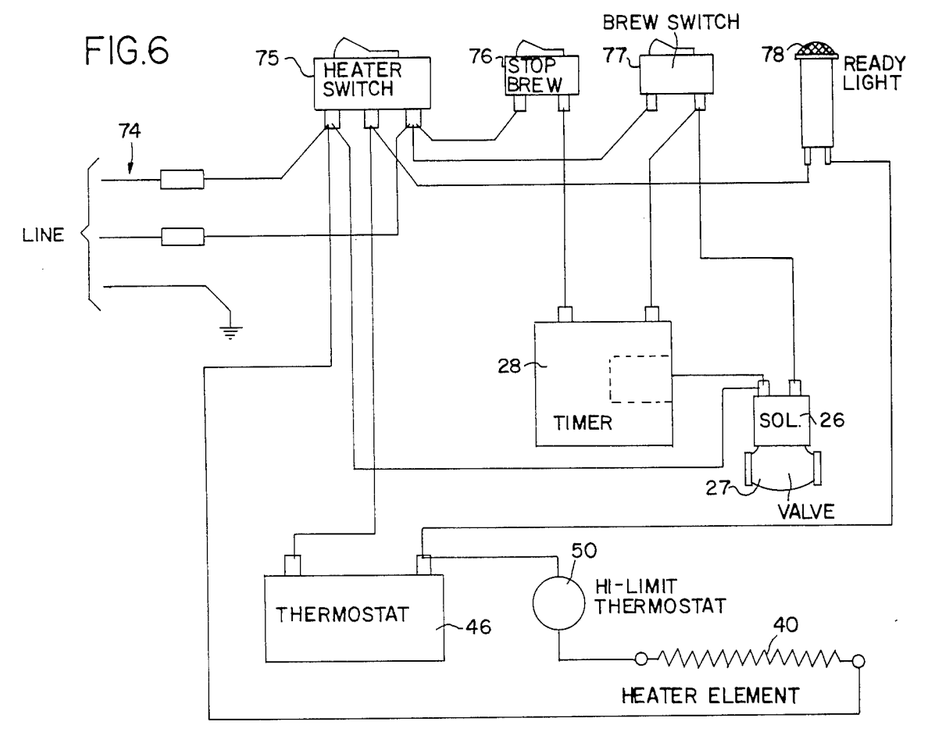

With reference now to FIG. 6, the electrical circuitry controlling the operation of the tea brewer 10 is diagrammed. A power line 74 provides, in the exemplary embodiment, a standard 120 v. A.C., 60 Hz., source of power. A heater switch 75 is activated in series with the running thermostat 46, which maintains the heater element 40 at the preset value set at thermostat 46 whereby to intermittently electrify the heater element 40. A stop brew switch 76 provides a manually operated shutdown switch which breaks the circuit for the time 28. A brew switch 77 is usd to initiate a cycle and when activated will energize the timer 28 to close a circuit for a preset cycle, which in a preferred form is 4 minutes and 5 seconds, for energizing the solenoid 26 and opening the associated valve 27. At the end of the timer cycle the solenoid 26 is de-energized to close the valve 27. A ready light 78 is wired with the running thermostat 46 so that when the thermostat is satisified, i.e. the appropriate temperature has been reached within the hot water tank 37, the ready light 78 is lit indicating that the water in the tank 37 is at the proper brewing temperature ready for a cycle to be initiated. The light 78 is not lit, as expected, while the running thermostat 46 is activating the heating element 40 to raise the water temperature to the set amount.

Operation Of The System

When ice tea is desired, the brew chamber 15 is lined with a filter paper and thereafter receives about 3 to 4 ounces of dried tea leaves usually needed for a 3 galloon total volume of tea. The brew chamber 15 is then positioned within the slide tracks 17 of the upper housing 11 and brewing may begin. Then, the brew switch 77 is activated to energize the timer 28 and thereby initiate a timed inlet sequence during which timer 28 activates the solenoid 26 and valve 27 to be open. In the disclosed embodiment, the valve 27 is open for 4 minutes and 5 seconds in order to introduce approximately 384 fluid ounces of water.

As the water is introduced through the valve 27, it is divided at the needle valve 29 which allows $\frac{1}{4}$ of the flow to the cold water inlet line 36 for conveying it to the fill tube 52 of the hot water tanka 37. The $\frac{3}{4}$ proportion of the inlet cold water is directed through the dilute line sections 33 and 35 to enter the reservoir or dispenser, 19 ready to soon receive and blend with the extract entering from the dip tube 61.

The orifice 59 is sized in proportion to the siphon rate and brew chamber size in the disclosed embodiment of generate a 9 to 10 minute drain period beginning at the initiation of the brew cycle for the introduction of 96 ounces of hot water and the passage of the hot water through the tea leaves and outwardly to the dip tube 61.

To prevent back siphoning of water through the inlet line 36, particularly near the end of the timed inlet cycle, it is vented to the atmosphere by the vent tube 70. In order to prevent the cold dilute water in first and second section lines 33 and 35 from entering the hot water tank 37, potentially resulting from suction along the line 70, or the line 63, the restrictor 73 in the dilute line section 33 creates a venturi effect through the straight line portion 72 of the Y-connector 34 thereby creating a suction from the second Y-connector 65 toward the first Y-connector 34. The function of the vent 63 also serves to ensure that all of the intended amount of hot water to be siphoned is directed through the siphon or brew water line 54 by maintaining atmospheric pressure above the water level. Further, the vent tube 63 provides a safety feature should the water level in the tank 37 accidentally reach the cover 38 whereby the water can be directed through the line 63 and safely received into the brew chamber 15.

The siphon elbow outlet 53 serves to prevent the unwanted post brewing cycle drip at the spray head assembly 58 by requiring that the level of the water must reach the level L2 before the siphon or brew water line 54 will function. Elevation L2 is the maximum expected heat-expanded level of the hot water between brewing cycles and therefore the elbow outlet 53 is of a size to accommodate this normal expansion level L2 without an undesirable drip in between brewing cycles through the siphon line 54.

The system also provides for the adjustment of the amount of inletted water by adjusting the timer 28 to different values which may take into account varying water service line pressures. Also, the needle valve 29 may be adjusted to slightly change the ¾:¼ division ratio of dilute to brewing water. Its been found that an acceptable range for tea brewing would be about 72 to 78 percent dilute to about 22 to 28 percent brewing water which achieves generally accepted taste levels and strengths for the brewed tea.

In the event that there is a malfunction, such as overheating or overfilling, the stop brew switch 76 may be manually activated to deenergize the timer 28 as shown in the circuit diagram of FIG. 6. Switch 76 offers a safety feature in addition to the provision of the high limit thermostat 50. The high limit thermostat 50 is wired in series with the running thermostat 46 whereby to override the running thermostat at a certain higher temperature and therefore de-energize the heating element 40, should excessive temperature be experienced in the range of the cover 38, as might occur should the hot water tank 37 unexpectedly boil dry or should a cycle be initiated with the tank 37 empty.

During the 9 to 10 minutes of extract drainage through the orifice 59, the extract is continually received through the dip tube 61 and is blended into the dilute cold water within the reservoir 19. Therefore, substantially the whole 3 gallon volume is ready for dispensing through the spigot 22 into a glass with ice if desired. The sight gauge 23 allows the restaurant worker to monitor the amount remaining and determine whether a second reservoir 19 might be required to be placed under the brew chamber 15 for a sequential batch of brewed tea. A plurality of reservoirs 19 could be provided so that a constant supply of ice tea may be made available, which is particularly desirable in a large volume fast food restaurant.

In the exemplary embodiment, it is envisioned that an amount of about 3 to 4 ounces of dried tea leaves are to be loaded in the brewing chamber 15 and held by a filter paper in a like manner similar to the brewing of ground coffee. With this amount it is usual that from about 10 to 14 ounces of extracted tea is retained in the tea leaves thereby reducing the brewing water volume from 96 ounces to about 82 to 86 ounces that is emitted through the orifice 59 into the reservoir 19.

The tea brewer 10 in the preferred embodiment is provided with an all stainless construction for the upper housing 11, removable top lid 12, lower housing 13, base 14, brew chamber 15, tea reservoir 19 with cover 20, cold water tank, 37 and cover 38, for ease of maintenance and cleaning.

ACHIEVEMENTS OF THE INVENTION

The tea brewer 10 efficiently provides an overfill water chamber as an inherent portion of the water tank capacity in the upper regions of the tank 37 above level L3 for compensating the variations in tank fill rate and expansion. An equalized water delivery system is provided by the use of the dividing needle valve 29 in combination with the back pressure caused by the venturi effect of restrictor 73 and in cooperation with the venting systems provided by the vent lines 63, 68, 70, joined by the Y-connectors 34 and 65.

The tea brewer 10 may be adjusted to vary the brew strength by varying the setting of the needle valve 29. The brew volume is also adjustable by the provision of the timer 28 operating the solenoid 26 and associated valve 27. The orifice 59 is proportioned in the system to provide for a 9 to 10 minute drip rate for a three galloon brew which provides a metering effect for a controlled flow ensuring proper steep time and optimal brewing conditions. All the adjustments may be easily made by simply removing the top lid to expose the operative components, as shown in FIG. 3.

What is claimed is:

1. A tea brewer comprising:
   a timed inlet valve means communicating with a source of water under pressure and being timed to open and admit a volume of water over a single continuous time sequence for each volume of tea to be brewed;
   a proportioning valve means in fluid communication with the inlet valve means for simultaneously proportioning two separate unequal outlet flows therefrom;
   a water tank and heating means for heating water in the tank;
   a reservoir means including first and second inlet means;
   a first water line means communicating with one of said outlet flows of said proportioning valve means for conveying a portion of the water directly into said water tank generally near the bottom thereof;
   a second water line means for fluidly communicating with the other outlet flow of said proportioning valve means and for conveying water directly to the first inlet means of said reservoir means;
   a brew water line means fluidly connected to said water tank for conveying hot water therefrom upon the level of water in said water tank being higher than a predetermined level;
   a brew chamber means in fluid communication with said brew water line means for receiving hot water therefrom and for holding tea leaves therein, said brew chamber including orifice means for draining brewed tea extract therefrom;
   said second inlet means of said reservoir means fluidly communicating with said orifice means of the brew chamber for receiving tea extract therethrough and said first inlet means being in fluid communication with said second water line means for receiving cold water therefrom, whereby tea extract and cold water are capable of being blended within said tea reservoir.

2. A tea brewer as claimed in claim 1 wherein said hot water tank includes vent means for maintaining substantially atmospheric pressure above the water level in said water tank.

3. A tea brewer as claimed in claim 2 wherein said second water line means communicates with vent means, said vent means venting to the atmosphere for the venting of said first water line means.

4. A tea brewer as claimed in claim 1 wherein said hot water tank is vented from the top to facilitate maintaining atmospheric pressure above the water therein and wherein said second water line means communicates with vent means therealong whereby to vent said first water line means to the atmosphere, and wherein said water tank vent and said vent means at said second water line means are joined by Y-connector means to a commonly joined vent tube, and commonly joined vent tube being arranged to vent to the atmosphere at an outlet end thereof located generally over said brew chamber means.

5. A tea brewer as claimed in claim 4 wherein said second water line means includes a second Y-connector means for joining said vent means thereat, said second water line means having a section of tubing, said section of tubing extending between said proportioning valve means and said second Y-connector means, said section of tubing including a restrictor means therein for increasing the flow pressure to create back pressure in said proportioning valve means for creating substantially full flow through said proportioning valve means and to create a venturi effect in said second Y-connector means.

6. A tea brewer as claimed in claim 1 wherein said water tank includes a cover arranged thereover and a fill tube means extending downwardly into the water tank and terminating at an outlet end generally near the bottom of said water tank, and wherein said first water line fluidly communicates with said fill tube means to convey said portion of water into the water tank generally near the bottom thereof.

7. A tea brewer as claimed in claim 1 wherein said second inlet means of said reservoir means commmunicates with dip tube means extending therefrom to generally the bottom of said reservoir whereby to direct the tea extract to the bottom of the reservoir for blending with the water conveyed from said second water line means.

8. A tea brewer as claimed in claim 1 wherein said reservoir means is freely movable and separable from said tea brewer.

9. A tea brewer as claimed in claim 1 wherein said brew water line means comprises a tube extending on an angle downwardly to the brew chamber at one end and at the other end fluidly communicating with the water tank at an elbow fitting that extends into the tank, said elbow fitting turned downwardly therefrom to open into said water tank at an elevation lower than said other end of the tube.

10. A tea brewer as claimed in claim 1 wherein said timed inlet valve means is adjustable to change the length of said single continuous time sequence.

11. A tea blending device for blending a larger volume of dilute water with a smaller volume of hot tea extract, said device comprising:
a timed inlet valve means for admitting a volume of water in one continuous time sequence;
a proportioning assembly having a single inlet fluidly communicating with the timed inlet valve means and having first and second outlets therefrom and means for proportioning simultaneous flows from the outlets having a larger volume from the first outlet than from the second outlet;
dilute water line means fluidly communicating with said first outlet of said proportioning assembly for conveying dilute water therefrom;
reservoir means fluidly communicating with said dilute water line means for receiving said dilute water therein;
inlet line means fluidly communicating with said second outlet of said proportioning assembly for conveying the smaller volume of water therefrom;
a hot water for holding a volume of hot water therein at a first level, said water tank having a side wall and a cover thereover, and fill tube means arranged within said hot water tank, said fill tube means fluidly communicating with said inlet line means for directly receiving said water therefrom, said fill tube means having an outlet located generally near the bottom of said hot water tank;
a brew water line means having an inlet end at an opening through said water tank side wall, said inlet end opening to said hot water tank at a second level higher than said first level of said hot water, said brew water line capable of conveying hot brew water from the water tank upon the introduction of a sufficient volume of water through said full tube means to raise said water level to said second level;
said brew water line means extending from said water tank to an opposite outlet end thereof lower than said inlet end;
a brew chamber arranged in fluid communication with the outlet end of said brew water line means and capable of holding tea leaves for receipt of hot brew water for the brewing thereof, and said brew chamber having outlet orifice means for draining extracted brew tea from the brew chamber; and
said reservoir including means fluidly communicating with said outlet orifice of said brew chamber for receiving said tea extract therein for blending with dilute water conveyed from said dilute water lie means.

12. A tea blending device as claimed in claim 11 wherein said proportioning assembly includes an adjustable needle valve.

13. A tea blending device as claimed in claim 11 including vent means for venting said inlet line means and said brew water line means to the atmosphere.

14. A tea blending device as claimed in claim 13 wherein said vent means includes a vent tube communicating from said hot water tank to a first Y-connector means, said first Y-connector means joined to another vent tube extending from a second Y-connector means arranged along said dilute water line means, and a third vent tube extending from said first Y-connector means, whereby said hot water tank and said inlet water line means are commonly vented to the atmosphere through said third vent tube.

15. A tea blending device as claimed in claim 14 wherein intermediate said second Y-connector means and said proportioning assembly, said dilute water line means includes restrictor means for creating back pressure in said proportioning assembly and for creating a venturi effect at said second Y-connector means.

16. A tea blending device as claimed in claim 11 wherein said fill tube means has a larger inside diameter than said inlet water line means.

17. A tea blending device as claimed in claim 11 wherein said hot water includes sufficient space above said first mentioned hot water level to accommodate therein more than the smaller volume of water conveyed through said inlet line means.

18. A system for tea brewing comprising:
- a heated water tank for maintaining a volume of hot water at a first level;
- a brew water tube means for conveying hot water for tea brewing from the water tank upon the level of the water therein reaching a second higher level;
- fill tube means for receiving cold water into said heated water tank and having an upper inlet and a lower outlet, the lower outlet opening within said hot water tank generally near the bottom thereof;
- valve assembly having a water receiving inlet, and two outlets therefrom for simultaneously delivering first and second unequal proportions of water;
- a first water line means communicating with one said outlet of the valve assembly for delivering one said proportion of water to the inlet of said fill tube means for direct delivery into said hot water tank;
- a second water line means for receiving water for diluting a tea extract and fluidly communicating with the other outlet of said valve assembly for receiving said second proportion of water;
- means for holding tea leaves to be brewed and having drain outlet means for draining a brewed extract therefrom, said means for holding tea leaves fluidly communicating with said brew water tube means to receive hot water therefrom; and,
- reservoir means having first inlet means arranged to receive the tea extract from said drain outlet means and second inlet means fluidly communicating with said second water line means for receiving said diluting second proportion of water;
- whereby tea extract and diluting water volumes are blended within said reservoir to make a tea blend.

19. A system for tea brewing as claimed in claim 18 wherein said system includes vent means for venting said brew water tube means and said first water line means.

20. A system for tea brewing as claimed in claim 19 wherein said means for venting includes a Y-connector arranged along said second water line means, said second water line means having a restrictor means upstream of said Y-connector whereby to create a venturi effect at said Y-connector.

21. A system for tea brewing as claimed in claim 18 wherein said valve assembly is adjustable whereby to vary the unequal proportions delivered through said two outlets thereof.

22. A system for tea brewing as claimed in claim 18 wherein the fill tube means of said heated water tank is larger in diameter than the first water line means communicating therewith.

23. A system for tea brewing as claimed in claim 18 wherein said system includes timed inlet means for controlling the amount of water received by the water receiving inlet of said valve assembly.

24. A tea brewer comprising:
- a timed inlet valve means communicating with a source of water under pressure and being timed to open and admit a volume of water over a single continuous time sequence for each volume of tea to be brewed;
- a proportioning valve means in fluid communication with the inlet valve means for simultaneously proportioning two seperate unequal outlet flows therefrom;
- a water tank and heating means for heating water in the tank;
- a reservoir means including first and second inlet means;
- a first water line means communicating with one of said outlet flows of said proportioning valve means for conveying a portion of the water directly into said water tank generally near the bottom thereof;
- a second water line means for fluidly communicating with the other outlet flow of said proportioning valve means and for conveying water directly to the first inlet means of said reservoir means;
- a brew water line means fluidly connected to said water tank for conveying hot water therefrom upon the level of water in said water tank being higher than a predetermined level;
- a brew chamber means in fluid communication with said brew water line means for receiving hot water therefrom and for holding tea leaves therein, said brew chamber including orifice means for draining brewed tea extract therefrom;
- said second inlet means of said reservoir means fluidly communicating with said orifice means of the brew chamber for receiving tea extract therethrough and said first inlet means being in fluid communication with said second water line means for receiving cold water therefrom, whereby tea extract and cold water are capable of being blended within said tea reservoir; and,
- vent means venting said hot water tank from the top to facilitate maintaining atmospheric pressure above the water therein and wherein said second water lie means communicates with another vent means therealong whereby to vent said first water line means to the atmosphere, and wherein said water tank vent means and said other vent means for said second water line means are joined by Y-connector means to a commonly joined vent tube, said commonly joined vent tube being arranged to vent to the atmosphere at an outlet end thereof located generally over said brew chamber means.

25. At tea brewer as claimed in claim 24 wherein said second water line means includes a second Y-connector means for joining said vent means thereat, said second water line means having a section of tubing, said section of tubing extending between said proportioning valve means and said second Y-connector means, said section of tubing including a restrictor means therein for increasing the flow pressure to create back pressure in said proportioning valve means for creating substantially full flow through said proportioning valve means and to create a venturi effect in said second Y-connector means.

26. A tea brewer comprising:
- a timed inlet valve means communicating with a source of water under pressure and being timed to open and admit a volume of water over a single continuous time sequence for each volume of tea to be brewed;
- a proportioning valve means in fluid communication with the inlet valve means and capable of simultaneously proportioning two separate unequal outlet flows therefrom;
- a water tank and heating means for heating water in the tank;
- a reservoir means including first and second inlet means;

a first water line means communicating with one of said outlet flows of said proportioning valve means for conveying a portion of the water directly into said water tank generally near the bottom thereof;

a second water line means for fluidly communicating with the other outlet flow of said proportioning valve means and for conveying water directly to the first inlet means of said reservoir means;

a brew water line means fluidly connected to said water tank for conveying hot water therefrom upon the level of water in said water tank being higher than a predetermined level;

a brew chamber means in fluid communication with said brew water line means for receiving hot water therefrom and for holding tea leaves therein, said brew chamber including orifice means for draining brewed tea extract therefrom;

said second inlet means of said reservoir means fluidly communicating with said orifice means of the brew chamber for receiving tea extract therethrough and said first inlet means being in fluid communication with said second water line means for receiving cold water therefrom, whereby tea extract and cold water are capable of being blended within said tea reservoir; and, said second inlet means of said reservoir means communicates with dip tube means extending therefrom to generally the bottom of said reservoir whereby to direct the tea extract to the bottom of the reservoir for blending with the water conveyed from said second water line means.

27. A tea blending device for blending a larger volume of dilute water with a smaller volume of hot tea extract, said device comprising:

a timed inlet valve means admitting a volume of water in one continuous time sequence;

a proportioning assembly having a single inlet fluidly communicating with the timed inlet valve means and having first and second outlets therefrom and means for proportioning simultaneous flows from the outlets having a larger volume from the first outlet than from the second outlet;

dilute water line means fluidly communicating with said first outlet of said proportioning assembly for conveying dilute water therefrom;

reservoir means fluidly communicating with said dilute water line means for receiving said dilute water therein;

inlet line fluidly communicating with said second outlet of said proportioning assembly for conveying the smaller volume of water therefrom;

a hot water tank for holding a volume of hot water therein at a first level, said water tank having a side wall and a cover thereover, and fill tube means arranged within said hot water tank, said fill tube means fluidly communicating with said inlet line means for directly receiving said water therefrom, said fill tube means having an outlet located generally near the bottom of said hot water tank;

a brew water line means having an inlet end at an opening through said water tank side wall, said inlet end opening to said hot water tank at a second level higher than said first level of said hot water, said brew water line means capable of conveying hot brew water from the water tank upon the introduction of a sufficient volume of water through said fill tube means to raise said water level to said second level;

said brew water line means extending from said water tank to an opposite outlet end thereof being lower than said inlet end;

a brew chamber arranged in fluid communication with the outlet end of said brew water line means and capable of holding tea leaves for receipt of hot brew water for the brewing thereof, and said brew chamber having outlet orifice means for draining extracted brew tea from the brew chamber;

said reservoir including means fluidly communicating with said outlet orifice of said brew chamber for receiving said tea extract therein for blending with dilute water conveyed from said dilute water line means;

vent means for venting said inlet line means and said brew water line means to the atmosphere, said vent means including a vent tube communicating from said hot water tank to a first Y-connector means, said first Y-connector means joined to another vent tube extending from a second Y-connector means arranged along said dilute water line means, and a third vent tube extending from said first Y-connector means, whereby said hot water tank and said inlet water line means are commonly vented to the atmosphere through said third vent tube; and, restrictor means along said dilute water line means intermediate said second Y-connector means and said proportioning assembly, said restrictor means capable of creating back pressure in said proportioning assembly and for creating a venturi effect at said second Y-connector means.

28. A system for tea brewing comprising:

a heated water tank for maintaining a volume of hot water at a first level;

a brew water tube means for conveying hot water for tea brewing from the water tank upon the level of the water therein reaching a second higher level;

fill tube means for receiving cold water into said heated water tank and having an upper inlet and a lower outlet, the lower outlet opening within said hot water tank generally near the bottom thereof;

valve assembly having a water receiving inlet, and two outlets therefrom for simultaneously delivering first and second unequal proportions of water;

a first water line means communicating with one said outlet of a valve assembly for delivering one said proportion of water to the inlet of said fill tube means for direct delivery into said hot water tank;

a second water line means for receiving said second proportion of water;

means for holding tea leaves to be brewed and having drain outlet means for draining a brewed extract therefrom, said means for holding tea leaves fluidly communicating with said brew water tube means to receive hot water therefrom; reservoir means having first inlet means arranged to receive the tea extract from said drain outlet means and second inlet means fully communicating with said second water line means for receiving said diluting second proportion or water; and, vent means for venting said brew water tube means and said first water line means, the vent means including a Y-connector arranged along said second water line means, said second water line means having a restrictor means upstream of said Y-connector whereby to create a venturi effect at said Y-connector;

whereby tea extract and diluting water volumes are blended within said reservoir to make a tea blend.

* * * * *